Feb. 21, 1939.  C. HOLLERITH  2,148,160
FAIRING HOLDER
Filed Nov. 10, 1937  2 Sheets-Sheet 1
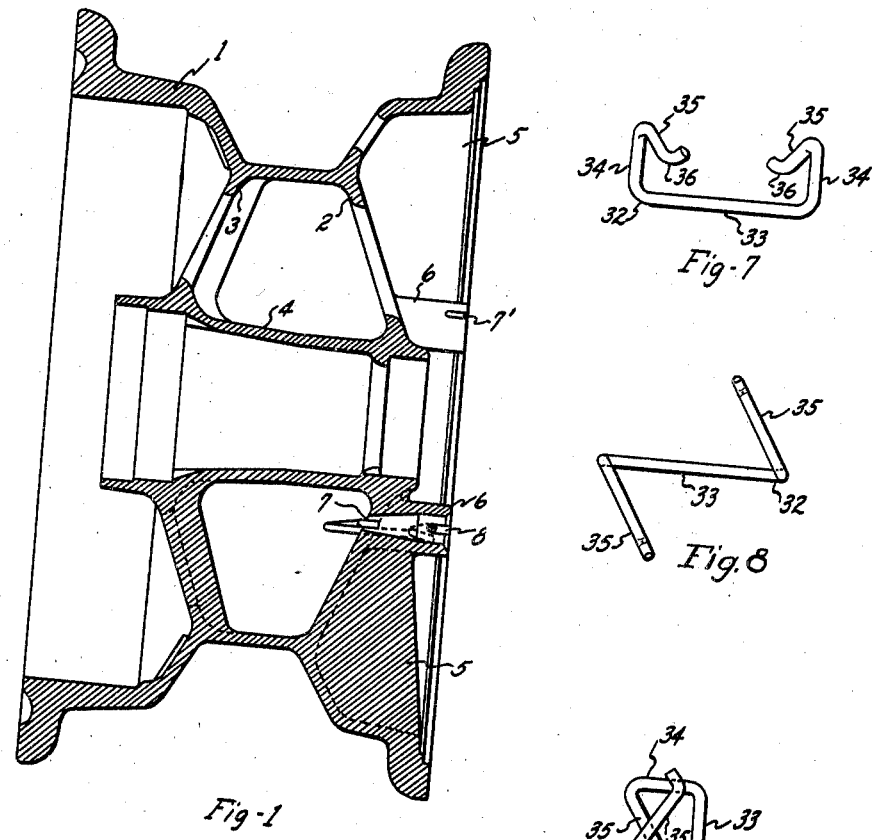
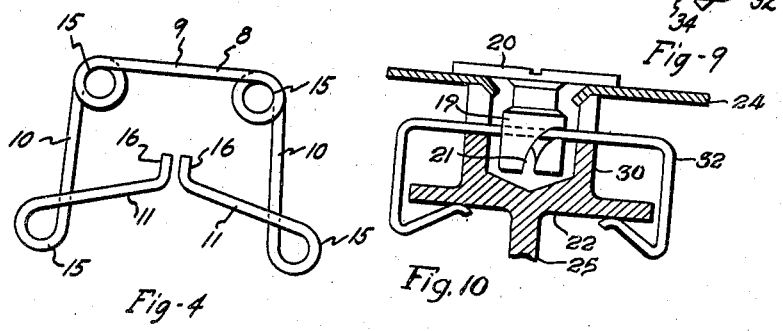
Charles Hollerith, Inventor
By Beaman & Langford, Attorney Feb. 21, 1939.  C. HOLLERITH  2,148,160
FAIRING HOLDER
Filed Nov. 10, 1937  2 Sheets-Sheet 2
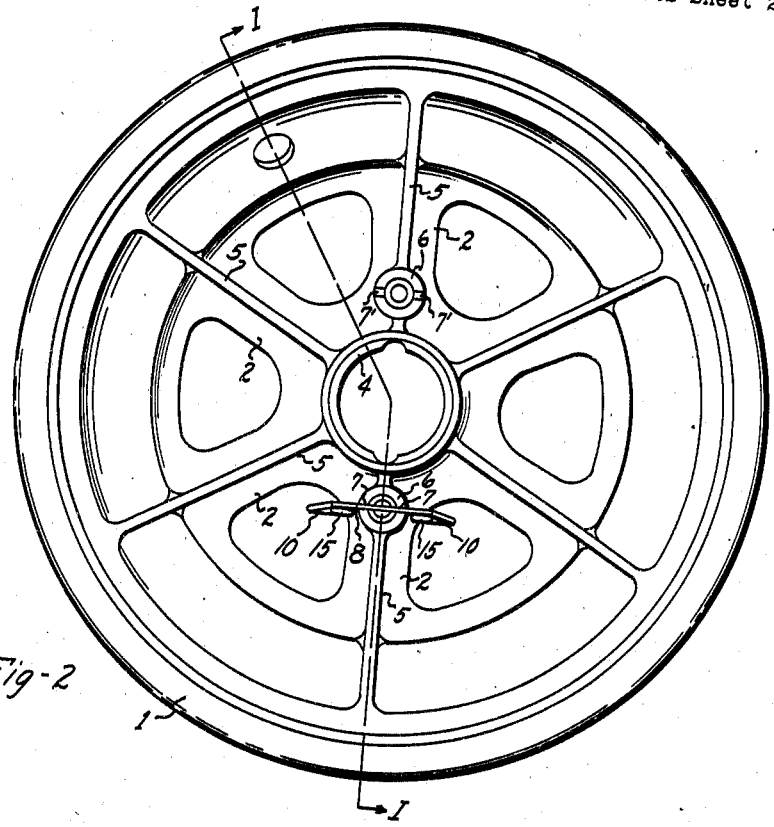
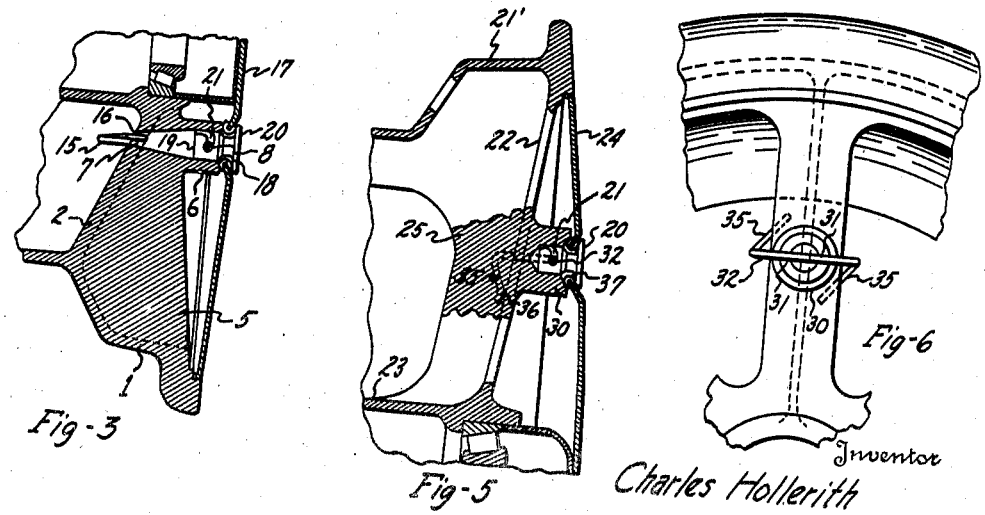
Inventor
Charles Hollerith
By Beaman & Langford Patented Feb. 21, 1939

2,148,160

UNITED STATES PATENT OFFICE 2,148,160

FAIRING HOLDER

Charles Hollerith, Jackson, Mich., assignor to Hayes Industries, Inc., Jackson, Mich., a corporation of Michigan Application November 10, 1937, Serial No. 173,797

11 Claims. (Cl. 301—37)

This invention relates to a fastening construction, and more particularly to a device adapted for securing fairings on airplane wheels or fastening any sheet metal member to a body structure.

The invention is an improvement over the patent to Dzus No. 1,955,740. The Dzus structure comprises a latching device having camming and latching surfaces adapted to cam a wire into latched relation therewith, the latching device being suitably secured to one member, generally having a head and extending through an opening in sheet metal, and the wire being secured to another member of two members which it is desired to secure together. Dzus secures his wire to the second of two members to be fastened together by fastening members such as rivets or screws. The present invention has for an object to eliminate the fastening of Dzus and substitute a resilient spring member which may be quickly and simply resiliently snapped into place.

Another object of the invention is to provide a support for mounting the wire latching member.

Still another object of the invention is to provide a wire latching member having integral anchoring tail pieces.

These and other objects will be apparent from the following specification when taken with the accompanying drawings, in which Fig. 1 is a section on the line I—I of Fig. 2, Fig. 2 is a side elevation of an airplane wheel disclosing the bosses mounting the latching wire according to the present invention, Fig. 3 is a partial section of the wheel shown in Fig. 1 showing the fairing attached, Fig. 4 is an elevation of the latching wire disclosed in Figs. 1, 2 and 3, Fig. 5 is a partial vertical section of another type of airplane wheel and a second type of latching wire with the fairing secured in place, Fig. 6 is a partial side elevation of a wheel disclosing the latching wire of Fig. 5 in place but with the fairing removed, Figs. 7, 8 and 9 are different views of the latching wire of Figs. 5 and 6, and Fig. 10 is a section through a wheel spoke and boss in a plane perpendicular to the plane of the section in Fig. 5.

Referring particularly to the drawings, the reference character 1 indicates the rim of an airplane wheel having spokes 2 and 3 and a hub 4. The spokes 2, as well as the rim 1, are reinforced by webs 5. The two opposed spokes 2 are provided with axially extending bosses 6, which are annular in configuration, and the interiors of which communicate with openings 7 through the spokes 2, as shown particularly in Fig. 1. As shown, the bosses 6 are integrally cast with the spokes 2 and the webs 5. The outer ends of the bosses 6 have opposed slots 7', in which are disposed latching wires 8. For clarity of illustration, in Figs. 1 and 2 the latching wires 8 are disposed in only one of the bosses 6. From Fig. 2 it will be clear that the latching wires 8 bridge the open ends of the bosses 6.

Referring particularly to Fig. 4, the latching wire 8 comprises a straight engagement portion 9, from the ends of which project in the same direction extensions 10, which are substantially parallel and have extending from their outer ends tail pieces 11, the engagement portion 9, the extensions 10, and the tail pieces 11 being in substantially the same plane. At the junctions of the tail pieces 11 and the extensions 10, and of the extensions 10 and the engagement portion 9, are coils 15 for the purpose of providing resiliency to the latching wire 8 and for facilitating its attachment to the wheel. The inner ends of the tail pieces 11 are provided with fingers 16 projecting toward the engagement portion 9. The fingers 16 project into the openings 7 in the rim 1 communicating with the interior of each boss 6. The tail pieces 11 and the fingers 16 thus serve to maintain the engagement portions 9 of the latching wires 8 within the slots 7' of each boss 6.

Disclosed in Fig. 3 is a fairing 17 having an opening 18, through which extends a latching device 19 of the character disclosed in the aforesaid patent to Dzus. The fastening device 19 has a head 20 bearing against the outside of the fairing 17 and also has a spiral slot 21 providing camming and latching surfaces, whereby when the spiral slot 21 is disposed over the latching wire 8 and the latching device 19 is partially rotated, the latching wire 8 is cammed inwardly of the slot 21 into latching relation, as shown in Fig. 3 and as disclosed in said patent to Dzus. By reference to Fig. 2 it will be seen that the latching wires 8 are of sufficient width to enable the extensions 10 to extend around the sides of the spokes 2.

In Fig. 5 is disclosed a partial section of a different type of airplane wheel from that of Figs. 1, 2 and 3, having a rim 21', spokes 22, hub 23, and a fairing 24. The material difference between the wheel of Fig. 5 and that first disclosed is that the stiffening web 25 for the spokes 22 is disposed inwardly of the spokes, rather than outwardly of the spokes. For such a form of wheel, a different type of latching wire is provided.

Secured to the opposed spokes 22 are bosses 30 provided at their outer ends with opposed slots 31, in which are disposed latching wires 32. The latching wires 32, disclosed particularly in Figs. 7, 8 and 9, have engagement portions 33, from the ends of which project extensions 34 which are substantially parallel and extend in the same direction. From the outer ends of the extensions 34 project in opposite directions tail pieces 35, which, as disclosed in Fig. 8, with their respective extensions 34 are in planes parallel to each other. The outer ends of the tail pieces 35 are slightly bent to provide camming surfaces 36 for engaging the inside of the spokes 22.

When a latching wire 32 is disposed in the slots 31 of a boss 30, the tail pieces 35 are snapped under the surface provided by the inside of a spoke 22, the camming surfaces 36 of the tail pieces 35 serving to facilitate the disposing of the latching wire 32 in its final position. Thus, when it is desired to secure the fairing 24 to the wheel, fasteners 19 are disposed through openings 37 in the fairing 24 opposite the bosses 30, the spiral camming and latching slot 21 engaging with the latching wire 32 to secure the fairing 24 to the wheel in the manner heretofore described.

From the foregoing description, it will appear that I have provided a latching wire which is resiliently secured to the wheel, which may be readily attached to the wheel, and which may be readily replaced in the event of breakage. The hollow bosses for mounting the latching wires may be provided with any type of wheel, as shown, or may be used on other structures than airplane wheels where it is desired to secure the parts together. While I have disclosed two bosses on opposed spokes for each wheel, it is of course understood that any number of bosses and latching devices 19 may be used as the circumstances require, and while I prefer to use latching devices having spiral camming and latching slots of the type disclosed in the aforesaid Dzus patent, it is to be understood that any other equivalent latching devices may be used without departing from the spirit of the invention. It is to be understood further that the term "boss" in the claims is considered to be descriptive of any equivalent of a boss. For instance, the boss, while conveniently annular, may take a non-annular form or comprise two spaced supporting posts for the latching wire.

Having thus described my invention, what I desire to secure by Letters Patent and claim is:

1. In a wheel of the character described, having a rim, a hub, spokes, and a fairing, a device for securing the fairing to said wheel, comprising tubular bosses having open ends extending axially outwardly from each of a plurality of the spokes of the wheel, each boss having provided at its outer end opposed transversely extending slots, a wire disposed in said slots in bridging relation to the open end of each boss, and means for yieldably maintaining said wire in said slots, said fairing having openings opposite said bosses, and latching devices, each having a body extending through each opening and a head bearing against the outer side of the fairing, said bodies having therein camming and latching surfaces for camming said wires into latched relation therewith to secure the fairing to the wheel.

2. In a wheel of the character described having a rim, a hub, spokes and a fairing, a device for securing the fairing to said wheel, comprising tubular bosses having open ends extending axially outwardly from each of a plurality of the spokes of the wheel, a wire secured over the open end of each boss in bridging relation thereto, said fairing having openings opposite said bosses, and latching devices, each having a body extending through each opening and a head bearing against the outer side of the fairing, said latching devices having on their bodies camming and latching surfaces for camming said wires into latched relation therewith to secure the fairing to the wheel.

3. In a wheel of the character described having a rim, a hub, spokes and a fairing, a device for securing the fairing to the wheel, comprising tubular bosses having open ends extending axially outwardly from each of a plurality of the spokes of the wheel, said bosses each having a transversely extending slot in the outer end thereof, a wire secured over the open end of each of said bosses in the respective slots therein in bridging relation to said bosses, each wire having tail pieces resiliently engaging on the opposite sides of the respective spokes from said bosses for anchoring the same, said fairing having openings opposite said bosses, and latching devices, each having a body extending through each opening and a head bearing against the outer side of the fairing, said latching devices having on their bodies camming and latching surfaces for camming said wires into latched relation therewith to secure the fairing to the wheel.

4. In a wheel of the character described having a rim, a hub, spokes and a fairing, a device for securing the fairing to the wheel, comprising bosses extending axially outwardly from each of a plurality of the spokes of the wheel, said bosses having bores therethrough opening at one end at the outer face of the wheel and at the other end at the opposite side of the wheel and at the spokes from said bosses, each of said bosses having a slot in the outer end thereof, a wire secured over the open end of each boss in bridging relation thereto, disposed in the respective slots therein, each wire having tail pieces resiliently engaging the opposite sides of said spokes from said bosses and projecting into the bores of the respective bosses for anchoring said wires to the respective bosses, said fairing having openings opposite said bosses, and latching devices, each having a body extending through each opening and a head bearing against the outer side of the fairing, said latching devices having on their bodies camming and latching surfaces for camming said wires into latched relation therewith to secure the fairing to the wheel.

5. In a wheel having a fairing, a device for securing the fairing to the wheel, comprising a plurality of tubular bosses having open ends, on said wheel, a wire secured over the open end of each boss in bridging relation thereto, said fairing having openings opposite said bosses, and latching devices, each having a body extending through each opening and a head bearing against the outer side of the fairing, said latching devices having on their bodies camming and latching surfaces for camming said wires into latched relation therewith to secure the fairing to the wheel.

6. In a wheel of the character described having a fairing, a device for securing the fairing to the wheel, comprising a plurality of tubular bosses upon said wheel, each of said bosses having an open end, a surface behind each boss away from the open end thereof, said surfaces being generally normal to the axis of each of said bosses, a slot in the open end of each of said bosses, a wire secured over the open end of each boss in bridging relation thereto disposed in the respective slots therein, said wires having integral extensions from the ends thereof, said extensions being of substantially the same length, and resilient tail pieces extending inwardly from the outer ends of said extensions, said tail pieces, extensions and wire being in substantially the same plane, said tail pieces being disposed behind said surface to maintain each wire in its respective slot, said fairing having openings opposite said bosses, and latching devices, each having a body extending through each opening and a head bearing against the outer side of the fairing, said latching devices having on their bodies camming and latching surfaces for camming said wires into latched relation therewith to secure the fairing to the wheel.

7. In a wheel of the character described having a fairing, a device for securing the fairing to the wheel, comprising a plurality of tubular bosses upon said wheel, each of said bosses having an open end, a surface behind each boss away from the open end thereof, said surfaces being generally normal to the axis of each of said bosses, an opening in each of said surfaces, a slot in the open end of each of said bosses, a wire secured over the open end of each boss in bridging relation thereto disposed in the respective slots therein, said wires having integral extensions from the ends thereof, said extensions being of substantially the same length, and resilient tail pieces extending inwardly from the outer ends of said extensions, said tail pieces, extensions and said extensions, said tail pieces, extensions and wire being in substantially the same plane, said tail pieces being disposed behind said surface to maintain each wire in its respective slot, substantially parallel fingers on the inner ends of said tail pieces, said fingers extending toward said wire and being disposed in the respective openings, said fairing having openings opposite said bosses, and latching devices, each having a body extending through each opening and a head bearing against the outer side of the fairing, said latching devices having on their bodies camming and latching surfaces for camming said wires into latched relation therewith to secure the fairing to the wheel.

8. In a wheel of the character described having a fairing, a device for securing the fairing to the wheel, comprising a plurality of tubular bosses upon said wheel, each of said bosses having an open end, a surface behind each boss away from the open end thereof, said surfaces being generally normal to the axis of each of said bosses, a slot in the open end of each of said bosses, a wire secured over the open end of each boss in bridging relation thereto disposed in the respective slots therein, said wires having integral extensions from the ends thereof, said extensions being of substantially the same length, and resilient tail pieces extending inwardly from the outer ends of said extension, said tail pieces, extensions and wire being in substantially the same plane, and having at the junction thereof coils for increasing the yieldability of said wire, said tail pieces being disposed behind said surface to maintain each wire in its respective slot, said fairing having openings opposite said bosses, and latching devices, each having a body extending through each opening and a head bearing against the outer side of the fairing, said latching devices having on their bodies camming and latching surfaces for camming said wires into latched relation therewith to secure the fairing to the wheel.

9. In a wheel of the character described having a fairing, a device for securing the fairing to the wheel, comprising a plurality of tubular bosses upon said wheel, each of said bosses having an open end, a surface behind each boss away from the open end thereof, said surfaces being generally normal to the axis of each of said bosses, a wire a slot in the open end of each of said bosses in bridging secured over the open end of each boss in the respective slots relation thereto disposed in the respective slots therein, integral extensions from the ends of said wires extending parallel to each other and being substantially the same length, and tail pieces secured to the outer end of said extensions, said tail pieces extending from said extensions in opposite directions and forming with said extensions, respectively, angles of substantially the same size, said tail pieces being disposed behind said surfaces to maintain each wire in its respective slot, said fairing having openings opposite said bosses, and latching devices, each having a body extending through each opening and a head bearing against the outer side of the fairing, said latching devices having on their bodies camming and latching surfaces for camming said wires into latched relation therewith to secure the fairing to the wheel.

10. In a wheel having a fairing, a device for securing the fairing to the wheel, comprising a plurality of fairing centering bosses on said wheel, a wire-like member extending laterally of each boss, said fairing having openings opposite said bosses, and latching devices, each having a body extending through each opening and head bearing against the outer side of the fairing, said latching devices having on their bodies camming and latching surfaces for camming said wire-like member into latched relation therewith to secure the fairing to the wheel.

11. In a wheel having a fairing, a device for securing the fairing to the wheel, comprising a plurality of fairing centering bosses projecting from said wheel, a slot in the outer end of each boss, a wire disposed in each slot having a portion extending laterally of each boss and being anchored to said wheel, said fairing having openings opposite said bosses, and latching devices, each having a body extending through each opening and a head bearing against the outer side of the fairing, said latching devices having on their bodies camming and latching surfaces for camming said wire into latched relation therewith to secure the fairing to the wheel.

CHARLES HOLLERITH.